United States Patent [19]

Henderson et al.

[11] Patent Number: 5,636,954
[45] Date of Patent: Jun. 10, 1997

[54] ADAPTER FOR A VEHICLE ARTICLE CARRIER

[75] Inventors: Brian E. Henderson, Fraser; Donald R. Potter, Clarkston, both of Mich.

[73] Assignee: JAC Products, Inc., Ann Arbor, Mich.

[21] Appl. No.: 434,311

[22] Filed: May 2, 1995

[51] Int. Cl.⁶ .................................................. B60R 9/00
[52] U.S. Cl. ........................ 411/84; 224/326; 411/85
[58] Field of Search ........................ 411/966, 84, 85, 411/87, 88; 224/321, 326

[56] References Cited

U.S. PATENT DOCUMENTS

| | | | |
|---|---|---|---|
| 2,688,504 | 9/1954 | Parker | 224/321 |
| 3,349,977 | 10/1967 | Caminiti | 224/321 |
| 4,022,037 | 5/1977 | Walters | 70/232 |
| 4,162,755 | 7/1979 | Bott | 224/326 |
| 4,270,681 | 6/1981 | Ingram | 224/321 |
| 4,448,336 | 5/1984 | Bott | 224/321 |
| 4,630,982 | 12/1986 | Fenner | 411/85 |
| 5,244,193 | 9/1993 | Hehr | 411/84 |

FOREIGN PATENT DOCUMENTS

| | | | |
|---|---|---|---|
| 4140187 | 6/1992 | Germany | 70/450 |

*Primary Examiner*—Darnell M. Boucher
*Attorney, Agent, or Firm*—Harness, Dickey & Pierce

[57] ABSTRACT

An adapter apparatus for securing the slats, or outer rail end or center supports, of a vehicle article carrier to an outer body surface of a vehicle. The adapter apparatus has a plurality of groups of openings for enabling attachment of a slat having previously formed openings to a variety of vehicles having different spacings of holes drilled therein, which would otherwise normally require additional drilling of holes in the slat or additional drilling of holes in the outer body surface to enable direct alignment of the holes in the slat with the holes in the outer body surface of the vehicle. The adapter apparatus, through its plurality of groups of openings, enables the adapter apparatus to be secured to vehicles having openings in their outer body surfaces which differ in spacing, and which otherwise would require additional drilling of holes in either the slats or the outer body surface to secure the slats thereto. A plurality of openings is further provided in the apparatus for enabling the slat to be secured to the apparatus. The apparatus is further of dimensions which enable it to be concealed within the interior area of the slat once the slat is secured to the outer body surface of the vehicle so as to not detract from the aesthetic appearance of the slat.

7 Claims, 4 Drawing Sheets

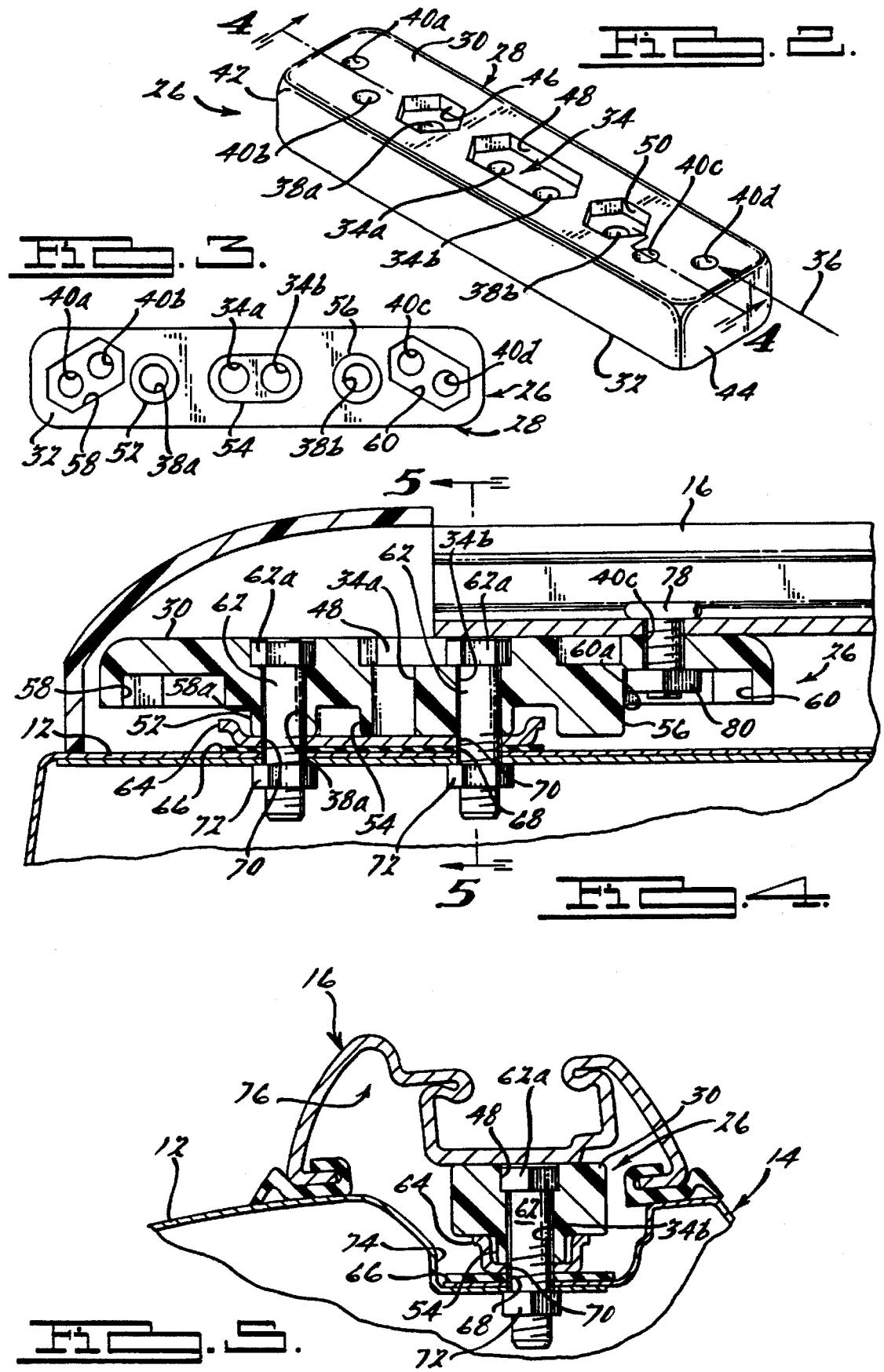

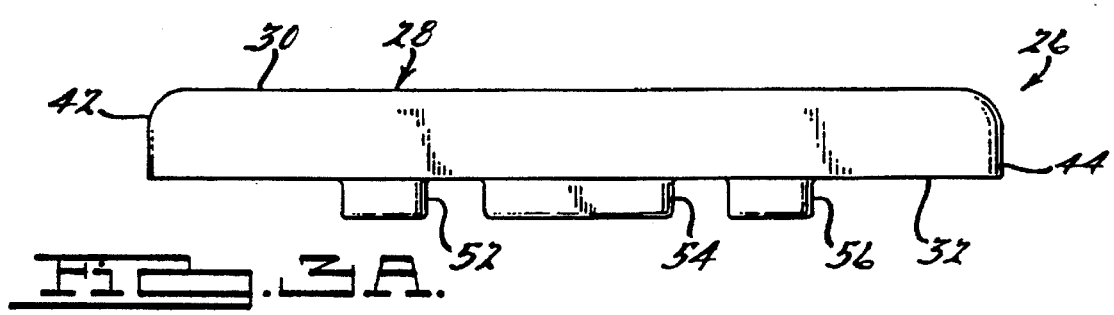
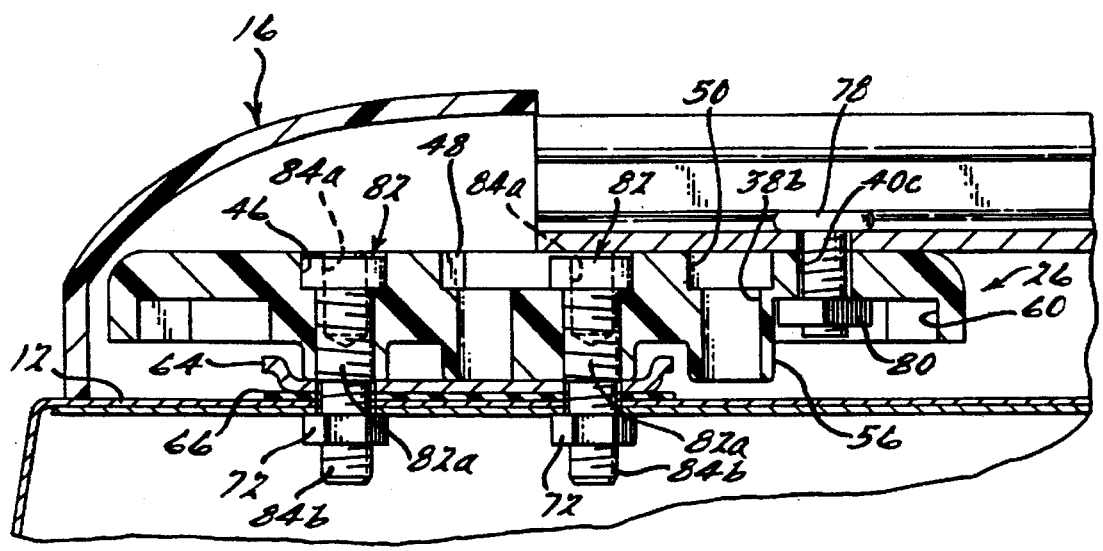
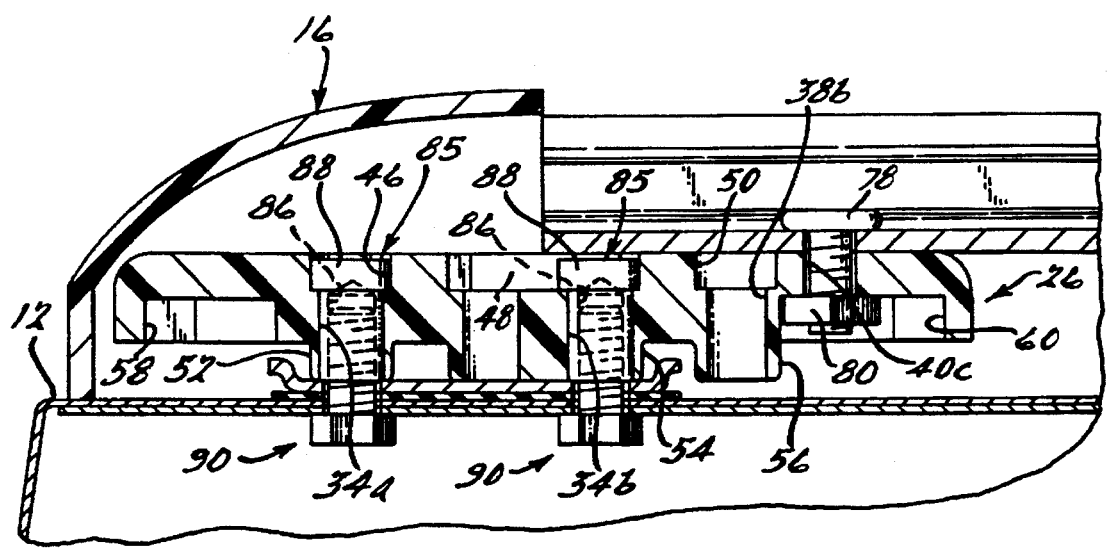

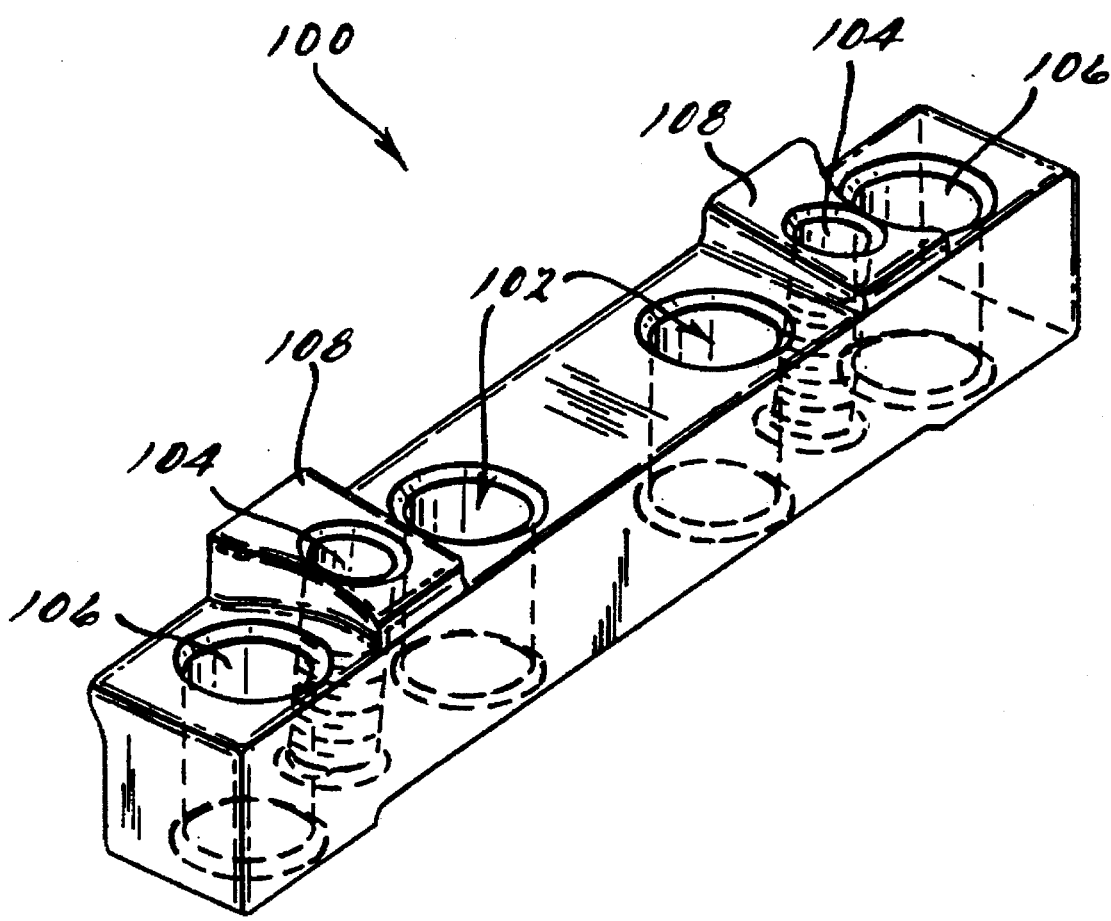
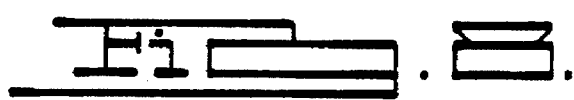

ADAPTER FOR A VEHICLE ARTICLE CARRIER

BACKGROUND OF THE INVENTION

1. Technical Field

This invention relates to vehicle article carriers, and more particularly to an adapter for securing a support or slat of a vehicle article carrier to an outer body surface such as a roof or deck lid of a vehicle.

2. Discussion

Vehicle article carriers are used in a wide-variety of applications to transport articles such as luggage which are too large or cumbersome to transport within a trunk or other interior area of the vehicle. Typically, such vehicle article carriers incorporate a slat or some form of end and/or center support to which a side rail is secured. With vehicle article carriers incorporating slats, a bracket member is typically fixedly or releasably securable to the slat and has attached to it a crossbar. A second bracket member at an opposite end of the crossbar is also either fixedly or releasably secured to its own associated slat. The slats are typically secured directly to the outer body vehicle surface and provide a means for supporting the bracket members and their associated crossbar on the outer body surface of the vehicle.

Vehicle article carriers incorporating end supports typically include a pair of side rails elevated from the outer body surface of the vehicle by a pair of end supports, which are in turn secured directly to the outer body surface of the vehicle. One or more crossbars may be fixedly or slidably coupled to the side rails such that cargo can be supported above the outer body surface by the crossbars and side rails.

With either of the above-described vehicle article carrier systems, the end (or enter) supports or slats need to be secured directly to the outer body surface of the vehicle. Typically, during construction of the vehicle, one or more openings are drilled or otherwise formed along areas closely adjacent opposite longitudinal sides of the vehicle roof or deck lid. With vehicle article carriers adapted to be secured to a roof of a vehicle, the holes are typically drilled or formed closely adjacent the outermost sides of the roof. Typically, the end supports or slats also have holes pre-drilled at certain positions there along which hasten the assembly of the vehicle article carrier to the roof.

As will be appreciated, the positioning of the openings in the slat or end support must align with the openings in the vehicle body for either the end support or slat to be easily attached to the outer body surface of the vehicle. With vehicles of different body lengths, the pre-drilled holes along the outermost sides of the outer body vehicle surface must often be drilled at varying distances. Accordingly, the length-wise spacing between pre-drilled holes in the vehicle roof, for different model vehicles, will vary slightly, thus necessitating additional pre-drilling of holes having the proper spacing in the slats. Accordingly, the manufacture and assembly of the slats or supports becomes more expensive and complicated because additional pluralities of openings which enable the slat or support to be secured to the specific pre-drilled holes in the outer body surfaces of specific model vehicles need to be provided.

Accordingly, it would be highly desirable to provide some form of adapter which enables a slat or end (or center) support having pre-drilled holes to be secured to a variety of outer body vehicle surfaces which employ openings having varying spacings therebetween which would otherwise not align perfectly with the spacings of the pre-drilled holes in the slats or supports.

It is still another object of the present invention to provide an adapter apparatus for a vehicle article carrier which enables a slat or end support to be secured to outer body surfaces of vehicles having pre-drilled, punched or otherwise formed holes of varying spacing, without the need for additional drilling of holes in the slat or support itself to enable the slat or support to be secured to the vehicle.

It is yet another object of the present invention to provide an adapter for securing a slat to a vehicle article carrier in which the adapter has a plurality of pre-drilled, precisely positioned holes for enabling the adapter itself to be secured to outer body surfaces of various vehicles having pre-drilled holes with varying spacings therebetween. Such an adapter would therefore be securable to a wide-variety of vehicle outer body surfaces and be securable itself to a slat, to thereby enable a slat having a minimum number of pre-drilled holes therein to be secured to outer body vehicle surfaces having openings which vary in spacing therebetween from vehicle-to-vehicle.

It is still another object of the present invention to provide an adapter suitable for securing a slat or support to an outer body surface of the vehicle, which adapter is light-weight, relatively inexpensive and easy to manufacture, and is concealable within an interior area of the slat or support when the slat or support is secured via the adapter to the outer body surface of the roof, to thereby not detract from the aesthetic appeal of the end support or slat when same is secured to the outer body surface of the vehicle.

SUMMARY OF THE INVENTION

The above and other objects are accomplished by an adapter apparatus in accordance with the preferred embodiments of the present invention. The adapter apparatus generally includes a main body having at least one first opening and at least one second opening spaced-apart from the first opening. The adapter apparatus is adapted to be secured to an outer body surface of a vehicle via a conventional threaded member which is positioned through either one of the first or second openings, through a pre-drilled or otherwise formed opening in the outer body surface of the vehicle, and secured to the outer body surface via a threaded fastener from an opposite side of the outer body surface of a vehicle. The slat may then be positioned over the adapter and a second threaded bolt or like fastening element positioned through the other one of the first and second openings in order to secure the slat to the adapter.

In a preferred embodiment of the present invention, the adapter includes a plurality of first openings and a plurality of second openings. The first openings are positioned closely adjacent one another, while at least one second opening is positioned on opposite longitudinal sides of the first plurality of openings. By incorporating a plurality of first openings and a plurality of second openings, an even greater degree of adjustability is provided to the adapter apparatus to enable it to be used with an even greater number of vehicles having pre-drilled openings of varying spacing along their outer body surfaces.

In the preferred embodiments of the present invention, a third plurality of openings are included. The third plurality of openings includes at least one-third opening at each longitudinal end of the main body, and more preferably a pair of third openings at each longitudinal end. Each of the first and second pluralities of openings further have associated therewith a recess on an upper surface of the main body, while each one of the third plurality of openings has associated therewith a recess on a lower surface of the main body. The recesses allow a head portion of a threaded bolt or nut to be held therein such that the head portion of the threaded bolt or nut does not protrude above either the upper or lower surfaces of the main body.

In an alternative preferred embodiment of the present invention, a threaded fastener is positioned or formed in at least one of the first plurality of openings or the second plurality of openings, and used to secure the adapter apparatus to the outer body vehicle surface in cooperation with a conventional, mating threaded member such as a nut, threaded bolt or stud screw.

In each of the above-described preferred embodiments, the adapter enables a slat having pre-drilled holes for attachment to be secured to a variety of vehicles having pre-drilled holes in the outer body surface which vary slightly in spacing from one another. The adapter eliminates the need for drilling of additional holes in the slat or precise drilling of additional holes in the outer body surface to provide aligned openings in the slat in the outer body surface to enable the slat to be attached to the particular vehicle. With the adapter apparatus of the present invention, a slat having a minimum plurality of pre-drilled holes can be quickly and easily secured to a wide-variety of different vehicles having openings which vary in spacing.

The adapter apparatus of the present invention is very compact, light-weight, relatively inexpensive to construct through conventional molding techniques, and is not visible when secured between the slat and the outer body surface of a vehicle. Accordingly, the adapter apparatus does not detract from the aesthetic appeal of the slat when in use.

BRIEF DESCRIPTION OF THE DRAWINGS

The various advantages of the present invention will become apparent to one skilled in the art by reading the following specification and subjoined claims and by referencing the following drawings in which:

FIG. 2 is an enlarged perspective view of the adapter apparatus of the present invention;

FIG. 3 is a bottom plan view of the adapter apparatus of FIG. 2;

FIG. 3A is a side view of the apparatus of FIG. 2;

FIG. 4 is a cross-sectional side view of the adapter apparatus of FIG. 2 taken in accordance with section line 4—4 of FIG. 2, and showing the slat in accordance with section line 4—4 of FIG. 1;

FIG. 5 is an end cross-sectional view of the adapter apparatus of FIG. 4 taken in accordance with section line 5—5 of FIG. 4;

FIG. 6 is a cross-sectional side view of a portion of a slat attached to a portion of an outer body surface of a vehicle, showing an alternative preferred embodiment of the adapter apparatus of the present invention which includes a pair of insert members having threaded outer shafts which may be used to secure the adapter and the slat to the outer body surface of the vehicle;

FIG. 7 is a cross-sectional side view of another alternative preferred embodiment of the present invention incorporating the use of threaded inserts for securing the adapter apparatus to the outer body surface of a vehicle; and FIG. 8 is a perspective view of an alternative preferred embodiment of the adapter apparatus of the present invention which is particularly adapted for use with end or center support members.

DETAILED DESCRIPTION OF THE PREFERRED EMBODIMENTS

Figure 1:
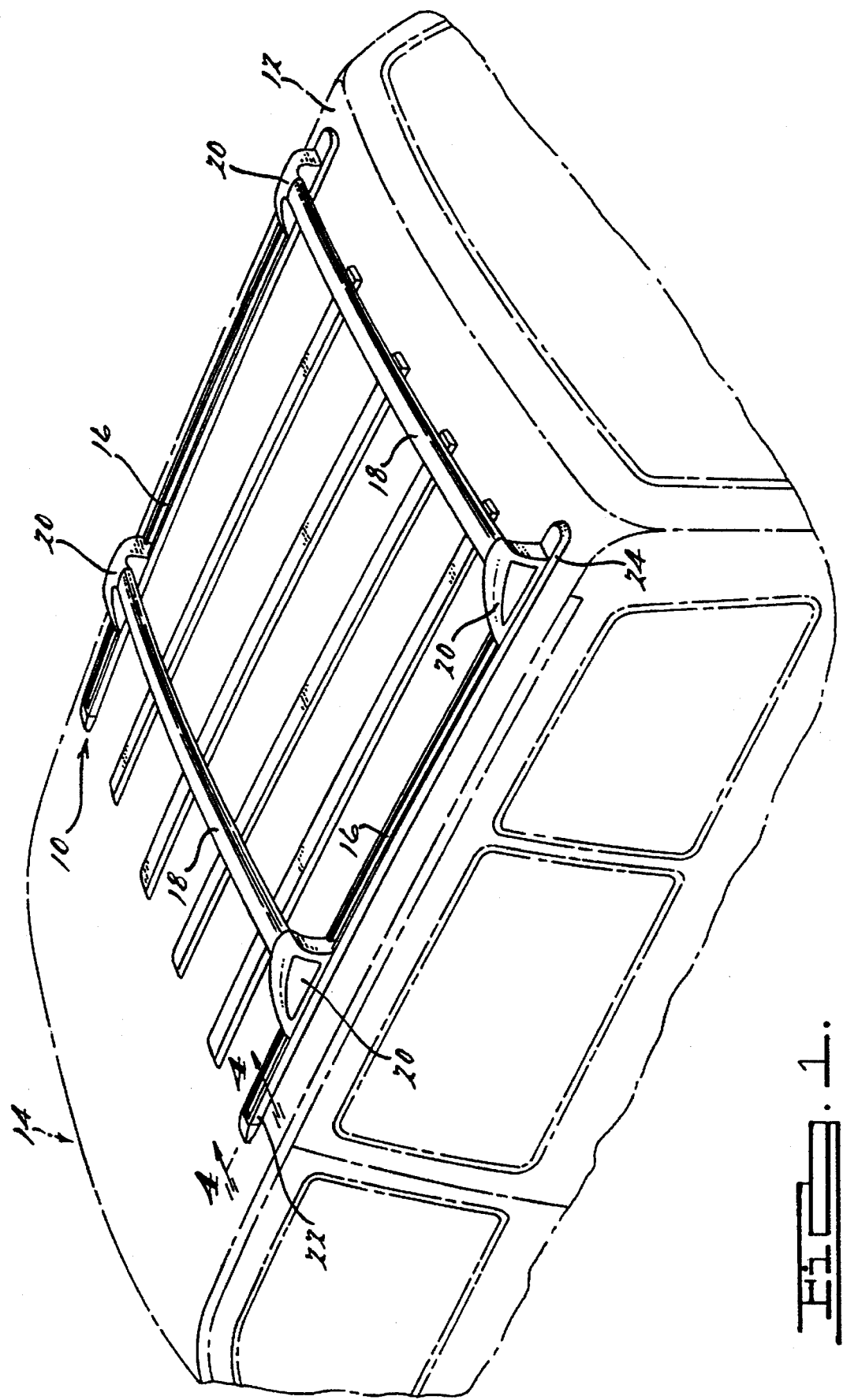
FIG. 1 is a perspective view of a portion of a vehicle showing a pair of slats and a pair of crossbars of a vehicle article carrier secured to an outer body surface of a vehicle.

Referring to FIG. 1, there is shown a vehicle article carrier 10 positioned on an outer body surface 12 of a vehicle 14. The vehicle article carrier 10 generally includes a pair of outermost slats 16 positioned longitudinally along the outer body surface 12 of the vehicle 14 and fixedly secured to the outer body surface 12. A pair of crossbars 18 each having a pair of bracket members 20 at an outermost end thereof are disposed on the slats 16 so as to be either fixed relative to the slats 16 or moveable slidably along the slats 16. Typically, both of the crossbars 18 are slidably, adjustably positionable, but one may also be fixedly mounted to the slats 16 if so desired. Cargo may then be supported on the crossbars 18 and slats 16 above the outer body surface 12.

Each of the slats 16 is typically secured to the outer body surface 12 via a plurality of openings which are pre-drilled in each of the slats 16 at precise, predetermined locations. Typically, at least one opening is pre-drilled in each slat 16 close to a forwardmost position 22 thereof, and at least one additional opening pre-drilled in each slat 16 close to a rearwardmost end 24 thereof. During assembly of the vehicle 14, when it is known that the vehicle 14 will have a vehicle article carrier attached thereto, a plurality of holes will be drilled in the outer body surface 12 for enabling the slats 16 to be secured to the outer body surface 12. As will be appreciated, the holes drilled in the outer body surface 12 of the vehicle 14 must align with the holes drilled in the slats 16 to allow the slats 16 to be easily secured to the outer body surface 12. If the holes drilled in the outer body surface 12 vary slightly in longitudinal and/or latitudinal spacing from one another at the positions where the forward and rearwardmost ends 22 and 24 of each slat 16 are to be attached, then the openings pre-drilled into the slat 16 will not align with the openings in the outer body surface 12. In this instance, additional holes would typically need to be drilled in the slat 16 which align perfectly with the openings in the outer body surface 12 to allow the slat 16 to be attached to the outer body surface 12. Accordingly, the need becomes apparent for some form of apparatus which will allow the slat 16 (which has holes pre-drilled therein for attachment) to be attached to a variety of different vehicles which have holes pre-drilled therein for the attachment of the slat 16, but which do not align perfectly with the pre-drilled openings in the slats 16. The same problem arises for end or center supports which may be used to support an outer support rail above the outer body surface 12.

Referring now to FIG. 2, there is shown an adapter apparatus 26 in accordance with a preferred embodiment of the present invention for enabling attachment of the slat 16 to the outer body surface 12 of the vehicle 14 when the holes drilled or otherwise formed in the outer body surface 12 do not perfectly align with the pre-formed holes in the slats 16. The adapter apparatus 26 generally includes a main body 28 having an upper surface 30 and a lower surface 32. A first plurality of openings 34 is formed at approximately the longitudinal center of the main body 28 such that openings 34a and 34b are positioned along a longitudinal centerline 36 extending along a major length of the main body 28. It will be appreciated, however, that the openings 34a and 34b could be longitudinally or laterally offset from the longitudinal center of the main body 28 if so desired, or depending on the specific vehicle(s) with which the adapter is to be used. In either instance, the openings 34a and 34b enable the slats 16 to be positioned generally parallel to each other on the outer body surface 12 to therefore allow full adjustable sliding movement of the crossbars 18.

A second plurality of openings 38a and 38b are also formed in the main body 28 and positioned such that the openings 38a and 38b are formed on opposite sides of the first plurality of openings 34 and along the longitudinal centerline. An optional third plurality of openings 40 may be included to provide an even greater degree of adaptability of the adapter apparatus 26. If incorporated, the third plurality of openings are positioned such that a pair 40a and 40b are positioned at a first end 42 of the main body 28, while a second pair, 40c and 40d, are positioned at a second end 44 thereof. The pair of openings 40a and 40b are further each offset from the longitudinal centerline as are each of the openings 40c and 40d.

With further reference to FIG. 2, the upper surface 30 of the main body 28 further includes a recess 46 formed coaxially with the opening 38a, a second elongated recess 48 formed so as to circumscribe both of the openings 34a and 34b, and a third recess 50 formed coaxially with the second opening 38b. Each of the recesses 46, 48 and 50 are adapted to accommodate either the head of a bolt or screw, the head of an insert member, or even a nut such that whichever type of fastening element is incorporated it will not protrude outwardly of the upper surface 30.

Referring now to FIGS. 3 and 4, the lower surface 32 of the adapter apparatus 26 preferably includes a plurality of boss portions 52, 54 and 56 through which the openings 34a, 38a, 34b and 38b, respectively, are formed in coaxial fashion. The openings 40a and 40b further have associated therewith a recess. 58, while the openings 40c and 40d have associated therewith a recess 60 stepped portions 58a and 60a and are formed adjacent the recesses 58 and 60, respectively, to permit placement of an external fastening nut threat without interfering with the outer body surface 12.

With continued reference to FIG. 4, the adapter apparatus 26 may be secured to the outer body surface 12 of the vehicle 14 via a pair of threaded bolts 62. The head portion 62a of each bolt 62 fits within its associated recess 52 or 54 such that it does not protrude above the upper surface 30. The adapter is preferably positioned over a reinforcing metal plate 64 which preferably sits on some form of rubber or other like sealing pad 66 positioned directly over the outer body surface 12. It will be appreciated, though, that the plate 64 and sealing pad 66 are optional and not essential to the use of the adapter apparatus 26. Each of the threaded bolts 62 extends through openings 68 drilled in the outer body surface 12 and corresponding openings 70 drilled or otherwise formed in the reinforcing plate 64 and the sealing pad 66. Threaded nuts 72 are used in connection with the threaded bolts 62 to securely fasten the adapter apparatus 26 to the outer body surface 12.

From FIG. 4, it will be appreciated that the first plurality of openings 34 and the second plurality of openings 38 enable the adapter apparatus 26 to be secured to vehicle outer body surfaces having openings formed therein which vary in spacing. Put differently, the adapter apparatus 26, through the use of its multiple pluralities of openings 34, 38 and 40, may be coupled to vehicles having differently spaced openings which would otherwise necessitate drilling additional openings in the slats to enable the slats 16 to be secured to the outer body surface 12 of the particular vehicle. Accordingly, if needed, the threaded bolts 62 could be positioned in the openings 34a and 38b if the particular vehicle had openings in the outer body surface formed at different positions from those shown in FIG. 4. Alternatively, the threaded bolts 62 could both be positioned within the openings 34a and 34b if needed to match the positioning of the openings in the outer body surface 12.

Thus, the multiple plurality of openings 34 and 38 thus allow the adapter apparatus 26 to be secured at a plurality of different positions, depending upon the precise positioning of the openings in the outer body surface of the particular vehicle to which the slat 16 is to be secured.

With brief reference to FIG. 5, it can be seen that the adapter apparatus 26 is further of cross-sectional dimensions which enable it to be positioned within a channel 74 which is typically formed in the outer body surface 12 of the vehicle 14, and within an interior area 76 of the slat 16. Accordingly, the adapter apparatus 26 is not visible once the slat 16 is secured to the outer body surface 12 of the vehicle 14. This prevents the adapter apparatus 26 from detracting from the overall aesthetic appearance of the slat 16.

With further reference to FIGS. 4 and 5, when the slat 16 is assembled to the outer body surface 12, the slat, in one assembly procedure, may be secured to the adapter apparatus 26 by a conventional threaded fastener 78 which is positioned through one of the openings 40. In this instance, the fastener 78 is shown positioned through the opening 40c, but it will be appreciated that the fastener 78 could just as well be positioned through the opening 40d, and possibly the openings 40a and/or 40b (depending on whether access is allowed to openings 40a and 40b by the specific design of the slat 16 or the configuration of the holes on the specific vehicle). A threaded nut 80 (or alternatively a threaded insert) is positioned (such as by adhesives or molding with the adapter apparatus 26) within the recess 60 and threadably engaged with the threaded fastener 78 to thus secure the slat 16 to the adapter apparatus 26. If the slat 16 is to be secured to the adapter apparatus 26 before the adapter 26 is secured to the outer body surface 12, then it is necessary to insert the threaded bolts 62 into the openings 38a and 34b prior to securing the slat 16 to the adapter apparatus 26, since access to one or more of the openings 38a and 34b may be limited once the slat 16 is secured to the adapter apparatus 26.

After the slat 16 is secured to the adapter apparatus 26, the assembly comprising the slat 16 and the adapter apparatus 26 is positioned over the outer body surface 12 of the vehicle 14 such that the threaded portions of each of the threaded bolts 62 pass through the openings 68 and the outer body surface 12 and the openings 70 in the mounting plate 64 and the sealing pad 66. From the interior of the vehicle 14, the threaded nut 72 may then be secured to the threaded portions of each of the threaded bolts 62, to thus secured the adapter apparatus 26 (and also the slat 16) directly to the outer body surface 12 of the vehicle 14.

With further reference to FIGS. 4 and 5, it will be appreciated that the adapter apparatus 26 could alternatively be secured first to the outer body surface 12 via the threaded bolt 62, and subsequently the slat 16 attached via one or more conventional threaded fasteners 78. In either procedure, the adapter apparatus 26 is easily and quickly installed without the need for special tools, modifications to the outer body surface 12 such as the drilling of additional openings, and without detracting from the aesthetic appearance of the assembled slat 16. If additional openings are formed in the outer body surface 12 between the forwardmost end 22 and the rearwardmost end 24 of each slat 16, then additional adapter apparatuses 26 could be secured at these points to even further securely hold the slat 16 to the outer body surface 12.

With reference to FIGS. 6 and 7, alternative preferred embodiments of the present invention are shown. With specific reference to FIG. 6, the adapter apparatus 26 incorporates the use of a pair of insert members 82. Each of the insert members 82 include a left-handed thread portion 82a having an internal recess 84a for inserting a suitably sized nut driver, allen head wrench or other like tool, and a right-handed threaded portion 84b. The tool is used to drive the left-handed thread portion 82a through the opening 38a. Likewise, the tool is used to drive the other insert member 82 through the opening 34b. In this manner, the insert members 82 become, in effect, permanently secured to the adapter apparatus 26. Conventional threaded nuts 72 are then used to secure the adapter apparatus 26 to the outer body surface 12. Thereafter, the slat 16 may be secured to the adapter apparatus 26 via the external threaded fastener 78 in the same manner as described in connection with FIGS. 4 and 5. Alternatively, the slat 16 and adapter apparatus 26 could be secured together prior to attaching the slat 16 to the outer body surface 12. It will be appreciated, then, that the adapter apparatus 26, as shown in FIG. 6, is identical in construction to the adapter apparatus described in connection with FIGS. 2–5, with the exception of the use of the insert members 82.

Referring now to FIG. 7, the adapter apparatus 26 is used in connection with a pair of threaded insert members 85 which are positioned within the openings 38a and 34b. Each insert member 85 includes a threaded internal bore 86 and a head portion 88 which fits within its associated recess 46 or 48. Each of the insert members 85 may be either molded into the adapter apparatus 26 during molding of the adapter 26, or simply inserted into the openings 38a and 34b during assembly of the adapter apparatus 26 to the outer body surface 12. The slat 16 may also be secured to the adapter apparatus 26 by incorporating a molded-in, threaded insertion hex nut and/or stud, if so desired. In either configuration, the insert members 85 enable the adapter apparatus 26 to be secured to the outer body surface 12 via conventional threaded bolts 90 which are inserted from the interior of the vehicle through the outer body surface 12.

Referring now to FIG. 8, an adapter apparatus 100 in accordance with an alternative preferred embodiment is shown. The apparatus 100 is also preferably injection molded from plastic, such as ABS plastic, and is specifically adapted for securing an end or center support to the outer body surface 12 and to a portion of an elevated sider (i.e., outer) rail of a vehicle article carrier.

The apparatus 100 includes a first pair of openings 102, a second pair of threaded openings 104, and a third pair of openings 106. A pair of raised surface portions 108 help to take up clearance between a mounting surface of the support (not shown) and the apparatus 100. The first plurality of openings 102 may be used to secure the apparatus 100 to the outer body surface 12, or alternatively, a combination of the first and second openings 102 and 106 may be used for this purpose, depending on the specific configuration of the openings in the vehicle outer body surface 12. The openings 104 are preferably used for securing the apparatus 100 to the support. Any form of fastener, such as those described herein, may be used with the apparatus 100.

The adapter apparatus 26 is preferably injection molded from a suitably high-strength plastic, although it could just as easily be die-cast, forged or formed from a variety of other manufacturing techniques. If formed through injection molding, preferably a suitably strong thermal plastic is used such as ABS plastic. The adapter apparatus 26, in any of the preferred embodiments described above, is quickly and easily secured to both the outer body surface 12 of the vehicle 14, as well as to the slat 16, to enable rapid assembly of a vehicle article carrier to the vehicle 14. The adapter apparatus 26 advantageously is not visible when secured to the outer body surface of a vehicle and therefore does not detract from the aesthetic appeal of the vehicle article carrier 10. Furthermore, the apparatus 26, being of compact and relatively inexpensive construction, does not add appreciably to the overall cost of the vehicle article carrier 10. Most importantly, however, the adapter apparatus 26 of the present invention enables slats or outer rail end and center supports of a vehicle article carrier to be secured to a variety of vehicles having different spaced pre-drilled or stamped holes in the outer body surfaces thereof, without the need for providing additional holes into the slats (or end or center supports) or additional holes into the outer body surface to enable attachment of the slats (or end/center supports) to the outer body surface. This, the single adapter apparatus 26 can be formed such that the openings 34, 38 and 40 will enable coupling of the apparatus 26 to a number of different hole configurations (i.e., spacings) on different vehicle models where it is known in advance what specific spacing configurations will be present.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. An adapter apparatus for securing a component of a vehicle article carrier to an outer body surface of a vehicle, said apparatus comprising:

a main body;

at least one first opening in said main body for enabling a first external fastening element to secure said main body to said outer body surface of said vehicle;

at least one second opening formed in said main body and spaced-apart from said first opening for enabling an external second fastening element to be used to secure said main body to said component of said vehicle article carrier;

said main body portion having an upper surface and a lower surface and being formed such that said lower surface includes a portion adjacent said one second opening which enables an external fastening member to be secured to said second fastening element without said fastening member interfering with said outer body surface;

said main body further including a pair of third openings formed laterally of said second opening; and said lower surface having a recess formed therein generally coaxially with said third openings; and wherein said recess associated with said third openings comprises a recess sufficiently large to accommodate a pair of external fastening nuts therein, with each one of said pair of external fastening nuts being associated with a respective one of said third openings.

2. The apparatus of claim 1, wherein said first opening includes a recessed portion for enabling a nut to reside therein over said first opening.

3. The apparatus of claim 1, wherein said second opening comprises a recessed portion for enabling said external fastening member to reside therein.

4. The apparatus of claim 1, further comprising at least one fastening member integrally formed with said main body.

5. The apparatus of claim 1, wherein said lower surface comprises a boss portion protruding outwardly therefrom which includes said first opening formed coaxially therewith; and wherein said lower surface further includes a second boss portion protruding outwardly therefrom and including said second opening formed coaxially therewith.

6. An adapter apparatus for securing a component of a vehicle article carrier to an outer body surface of a vehicle and adapted to be interposed between said component and said outer body surface, said apparatus comprising:

a main body having an upper surface and a lower surface;

said main body including a first plurality of openings positioned along a centerline of a major length of said main body;

a plurality of recesses associated with said first plurality of openings;

a second plurality of openings positioned along said centerline with at least a pair of said second plurality of openings being positioned on opposite sides of said first plurality of openings;

a second plurality of recesses associated with said second plurality of openings;

a third plurality of openings in said main body formed so as to be laterally offset from said centerline and further positioned such that at least one of said third plurality of openings is formed at opposite longitudinal ends of said main body; and a plurality of boss portions protruding from said lower surface of said main body and being associated with said first and second pluralities of openings.

7. The apparatus of claim 6, wherein a pair of said third plurality of openings is formed at each longitudinal end of said main body.

* * * * *

UNITED STATES PATENT AND TRADEMARK OFFICE
CERTIFICATE OF CORRECTION

PATENT NO. : 5,636,954
DATED : June 10, 1997
INVENTOR(S) : Brian E. Henderson et al It is certified that error appears in the above-indentified patent and that said Letters Patent is hereby corrected as shown below:

Col. 1, line 11, "wide-variety" should be --wide variety--

Col. 1, line 34, "enter" should be --center--

Col. 2, line 14, "wide-variety" should be --wide variety--

Col. 2, line 19, "vehicle-to-vehicle" should be --vehicle to vehicle--

Col. 3, line 23, "wide-variety" should be --wide variety--

Col. 4, line 58, "centerline" should be --center line--

Col. 5, line 5, "centerline" should be --center line--

Col. 5, line 12, "centerline" should be --center line--

Col. 5, line 29, "recess.58" should be --recess 58--

Col. 5, line 33, "threat" should be --thereat--

UNITED STATES PATENT AND TRADEMARK OFFICE
CERTIFICATE OF CORRECTION

PATENT NO. : 5,636,954

DATED : June 10, 1997

INVENTOR(S) : Brian E. Henderson et al

It is certified that error appears in the above-indentified patent and that said Letters Patent is hereby corrected as shown below:

Col. 6, line 47, "secured" should be --secure--

Col. 7, line 4, "allen" should be --Allen"

Col. 8, line 15, "This," should be --Thus,--

Col. 9, line 14, claim 6, "centerline" should be --center line--

Col. 9, line 19, claim 6, "centerline" should be --center line--

Col. 10, line 6, claim 6, "centerline" should be --center line--

Signed and Sealed this

Eleventh Day of November, 1997

Attest:

BRUCE LEHMAN

Attesting Officer

Commissioner of Patents and Trademarks